US012629549B2

(12) United States Patent
Grechanuk et al.

(10) Patent No.: US 12,629,549 B2
(45) Date of Patent: May 19, 2026

(54) CATASTROPHIC WILDFIRE INDEX FOR FORECASTING UTILITY-CAUSED WILDFIRES

(71) Applicant: Technosylva, Inc., La Jolla, CA (US)

(72) Inventors: Pavel Aleksandrovich Grechanuk, Portland, OR (US); Adrián Cardil Forradellas, Binéfar (ES); Steven Craig Vanderburg, Camas, WA (US); Santiago Daniel Monedero Timón, Madrid (ES); Joaquin Ramirez Cisneros, La Jolla, CA (US)

(73) Assignee: Technosylva, Inc., La Jolla, CA (US)

( * ) Notice: Subject to any disclaimer, the term of this patent is extended or adjusted under 35 U.S.C. 154(b) by 0 days.

(21) Appl. No.: 18/812,936

(22) Filed: Aug. 22, 2024

(65) Prior Publication Data

US 2026/0054110 A1      Feb. 26, 2026

(51) Int. Cl.
*A62C 3/02* (2006.01)
*G06N 7/01* (2023.01)
*G08B 17/00* (2006.01)
*G08B 31/00* (2006.01)

(52) U.S. Cl.
CPC ................. *A62C 3/02* (2013.01); *G06N 7/01* (2023.01); *G08B 17/005* (2013.01); *G08B 31/00* (2013.01)

(58) Field of Classification Search
CPC .......... A62C 3/02; G06N 7/01; G08B 17/005; G08B 31/00
See application file for complete search history.

(56) References Cited

U.S. PATENT DOCUMENTS

| | | | |
|---|---|---|---|
| 9,297,723 B1 | 3/2016 | Hofmann et al. | |
| 2019/0228362 A1 | 7/2019 | Anagnostou et al. | |
| 2022/0161075 A1 * | 5/2022 | Snook .................. | G08B 17/005 |
| 2022/0236451 A1 * | 7/2022 | Sun ........................ | G06N 20/10 |
| 2023/0023808 A1 * | 1/2023 | Wall ....................... | G06Q 40/08 |
| 2023/0342526 A1 | 10/2023 | Farley et al. | |
| 2023/0347193 A1 * | 11/2023 | Ginsberg ................ | A62C 2/04 |
| 2024/0242299 A1 | 7/2024 | Elbl et al. | |
| 2024/0399181 A1 * | 12/2024 | Umunnakwe ........ | A62C 3/0228 |

OTHER PUBLICATIONS

PCT International Search Report and Written Opinion, PCT Application No. PCT/US2025/042738, Dec. 10, 2025, 20 pages.

* cited by examiner

*Primary Examiner* — Steven Lim
*Assistant Examiner* — James E Munion
(74) *Attorney, Agent, or Firm* — Fenwick & West LLP

(57)          ABSTRACT

A service inputs wind data and utility data corresponding to a utility component into a first machine learning model to determine an outage risk prediction representing a probability that the utility component will have an outage. The service determines a probability of ignition at a vicinity of the utility component, and determines a set of wildfire impact measurements by simulating a wildfire in the vicinity of the utility component. The service inputs the outage risk prediction, the probability of ignition, and the set of wildfire impact measurements into a second machine learning model, and receives as output from the second machine learning model, a catastrophic wildfire risk score corresponding to the utility component. The service outputs a graphical representation on a dashboard representing the catastrophic wildfire risk score.

17 Claims, 6 Drawing Sheets

300

| Transmission Circuit | Today | Fri. | Sat. | Sun. |
|---|---|---|---|---|
| ◈ CASCADE – WHITE RIVER | | | | |
| ◈ CLE ELUM – HYAK | | | | |
| ◈ CLE ELUM – KITTITAS | | | | |
| ◈ POISON SPRING – WIND RIDGE | | | | |
| ◈ ROCKY REACH – CASCADE | | | | |
| ◈ SCHNEBLY – POISON SPRING | | | | |
| ◈ WANAPUM – WIND RIDGE 230kV | | | | |
| ◈ WILD HORSE GEN. – POISON SPRING | | | | |
| ◈ ALDERTON – ELECTRON HEIGHTS | | | | |
| ◈ ALDERTON – FREDERICKSON #2 | | | | |
| ◈ ALDERTON – KRAIN CORNER | | | | |
| ◈ BAKER – SEDRO WOOLLEY #1 | | | | |
| ◈ BAKER – SEDRO WOOLLEY #2 | | | | |
| ◈ BAKER RIVER – BAKER RIVER LOWER | | | | |
| ◈ BANGOR – FOSS CORNER | | | | |

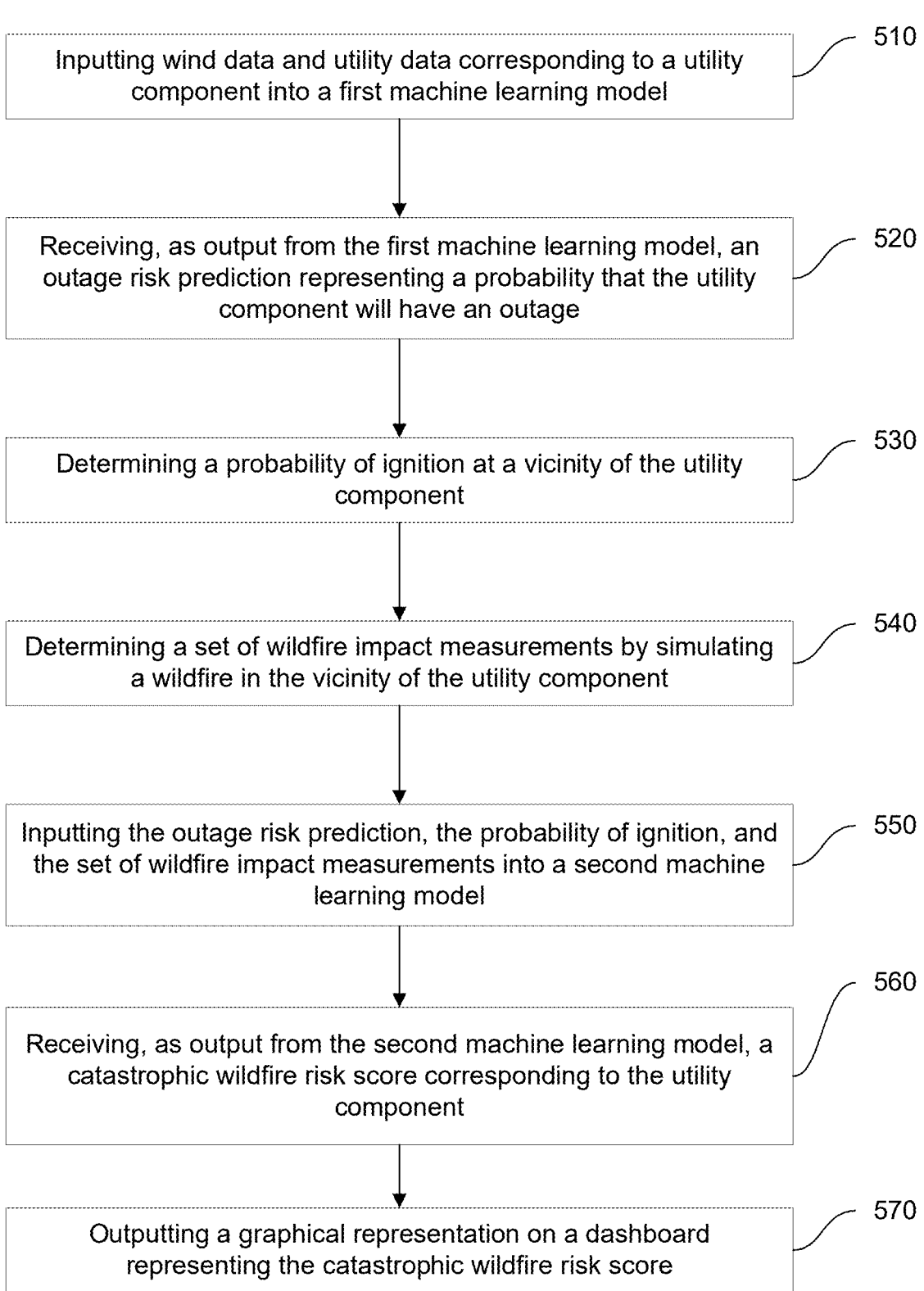

Inputting wind data and utility data corresponding to a utility component into a first machine learning model — 510

Receiving, as output from the first machine learning model, an outage risk prediction representing a probability that the utility component will have an outage — 520

Determining a probability of ignition at a vicinity of the utility component — 530

Determining a set of wildfire impact measurements by simulating a wildfire in the vicinity of the utility component — 540

Inputting the outage risk prediction, the probability of ignition, and the set of wildfire impact measurements into a second machine learning model — 550

Receiving, as output from the second machine learning model, a catastrophic wildfire risk score corresponding to the utility component — 560

Outputting a graphical representation on a dashboard representing the catastrophic wildfire risk score — 570

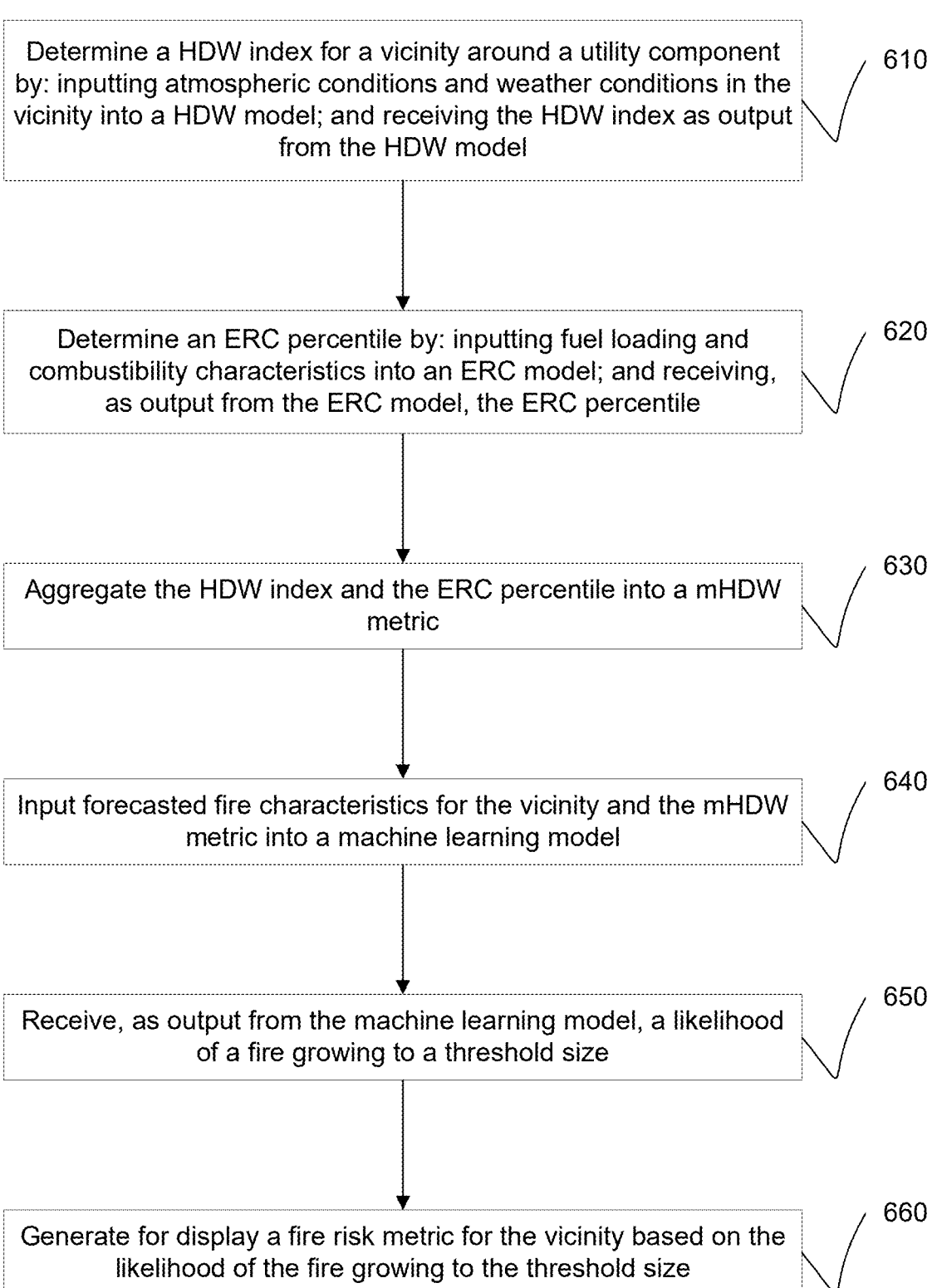

Determine a HDW index for a vicinity around a utility component by: inputting atmospheric conditions and weather conditions in the vicinity into a HDW model; and receiving the HDW index as output from the HDW model          610

Determine an ERC percentile by: inputting fuel loading and combustibility characteristics into an ERC model; and receiving, as output from the ERC model, the ERC percentile          620

Aggregate the HDW index and the ERC percentile into a mHDW metric          630

Input forecasted fire characteristics for the vicinity and the mHDW metric into a machine learning model          640

Receive, as output from the machine learning model, a likelihood of a fire growing to a threshold size          650

Generate for display a fire risk metric for the vicinity based on the likelihood of the fire growing to the threshold size          660

*FIG. 6*

CATASTROPHIC WILDFIRE INDEX FOR FORECASTING UTILITY-CAUSED WILDFIRES

TECHNICAL FIELD

Aspects of this disclosure generally relate to the field of forecasting weather events, and more particularly relate to machine learning approaches to forecasting utility-caused wildfires.

BACKGROUND

Dry and hot conditions have made wildfire risk increasingly prevalent in recent years. Utilities (e.g., electrical utilities) have an outsized contribution to wildfires given their large footprint in wildfire-prone geographies. To avoid contributing to wildfires, utilities may disable components that are prone to having outages that cause wildfires. However, disabling these components causes a disruption of utility access by communities, and therefore is not desirable to be performed unless absolutely necessary.

SUMMARY

Systems and methods are disclosed herein that predict catastrophic wildfire risk on a per-component basis for utilities. In some embodiments, the risk of an outage of a utility component may be merged with other wildfire factors, such as a probability of ignition if an outage did occur, and a simulated impact of a wildfire if an ignition did occur. Together, these factors may inform a risk index for each component of a utility, enabling the utility to make component shutoff decisions on a granular and accurate basis, thus maximizing runtime of components while minimizing the risk of components causing consequential wildfires.

In some embodiments, a wildfire forecast tool inputs wind data and utility data corresponding to a utility component into a first machine learning model to determine an outage risk prediction representing a probability that the utility component will have an outage. The wildfire forecast tool determines a probability of ignition at a vicinity of the utility component, and determines a set of wildfire impact measurements by simulating a wildfire in the vicinity of the utility component. The wildfire forecast tool inputs the outage risk prediction, the probability of ignition, and the set of wildfire impact measures into a second machine learning model, and receives as output from the second machine learning model, a catastrophic wildfire risk score corresponding to the utility component. The wildfire forecast tool outputs a graphical representation on a dashboard representing the catastrophic wildfire risk score.

In some embodiments, a wildfire forecast tool determines a Hot Dry Windy (HDW) index for a vicinity around a utility component by inputting atmospheric conditions (e.g., temperature and moisture content in the vicinity) into a HDW model and receiving the HDW index as output from the HDW model. The wildfire forecast tool determines an Energy Release Component (ERC) percentile by inputting fuel loading and combustibility characteristics into an ERC model and receiving, as output from the ERC model, the ERC percentile. The wildfire forecast tool aggregates the HDW index and the ERC percentile into a modified HDW (mHDW) metric, inputs forecasted fire characteristics for the vicinity and the HDW index into a machine learning model, and receives as output from the machine learning model a likelihood of a fire growing to a threshold size. The wildfire forecast tool displays fire risk metric for the vicinity based on the likelihood of the fire growing to the threshold size.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

FIG. 3 illustrates an exemplary user interface showing outage consequence risk as determined by the wildfire forecast tool, in accordance with an embodiment.

FIG. 5 illustrates an exemplary flowchart illustrating a process for determining a catastrophic wildfire index relating to outage risk, in accordance with an embodiment.

FIG. 6 illustrates an exemplary flowchart illustrating a process for determining a risk index based on a modified hot dry windy analysis, in accordance with an embodiment.

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Figure 1:
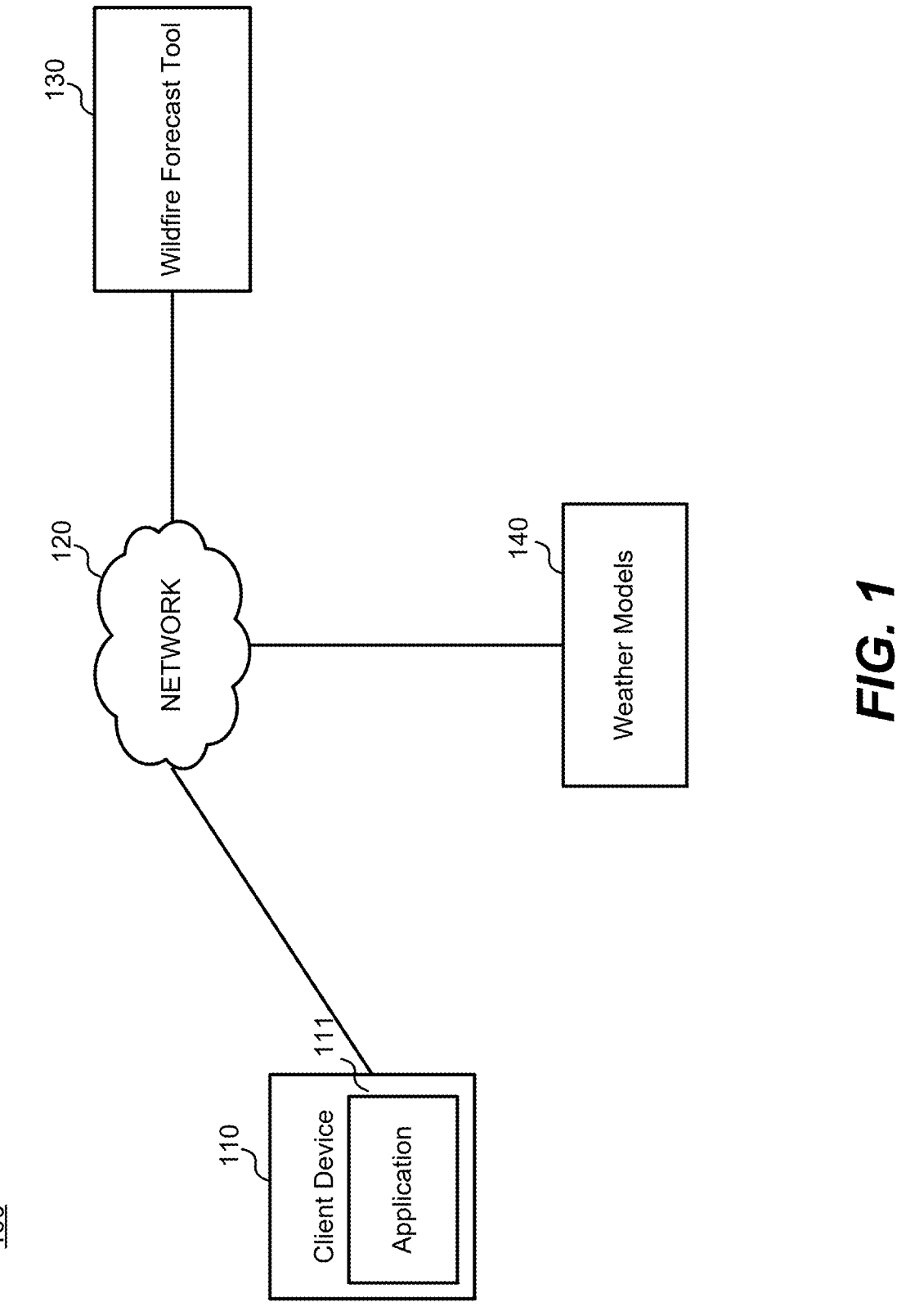
FIG. 1 illustrates one embodiment of a system environment for implementing a wildfire forecast tool.

FIG. 1 illustrates one embodiment of a system environment for implementing a wildfire forecast tool. As depicted in FIG. 1, environment 100 includes client device 110 with application 111 installed thereon, network 120, wildfire forecast tool 130, and weather models 140. Client device 110 may be any device having a user interface useable to interact with wildfire forecast tool 130 via application 111. Exemplary client devices may include personal computers, laptops, tablets, smartphones, and so on. While only one client device 110 is depicted, any number of client devices may be used. Multiple client devices may be used at a same time to access and otherwise collaborate on forming a wildfire forecast. Client device 110 may be operated by, e.g., a utility seeking to determine wildfire risk based on an outage of a utility component.

Application 111 may be a dedicated application installed on client device 110 for performing a wildfire forecast (e.g., based on a utility outage). Application 111 may be installed directly or indirectly from wildfire forecast tool 130 (e.g., downloaded from wildfire forecast tool 130; downloaded from an application store; from a hard drive having installation code, and so on). Any wildfire forecast activities may in whole or in part be performed on client device 110 by application 111 or may be performed in the cloud (e.g., using wildfire forecast tool 130). Application 111 may be a browser through which weather forecast functionality may be accessed from wildfire forecast tool 130. Details on activities of client device 110 and application 111 are discussed in further detail with reference to FIGS. 2-7.

Network 120 may be a data communication channel between client device 110 and weather forecast tool 130. The data communication channel may be any channel usable to transmit communications between these entities, such as the Internet, a local area network, a wireless network, a short-range communications network, and so on. Network 120 may facilitate communication between any number of client devices and external servers and services beyond those depicted in environment 100.

Wildfire forecast tool 130 may be a cloud-based provider takes various parameters as an input (e.g., utility component outage risk, landscape around utility component, etc.), and provides a forecast for a wildfire event based on those parameters as described herein. All functionality described herein with respect to application 111 may be performed by wildfire forecast tool 130, and all functionality described herein with respect to wildfire forecast tool 130 may be performed by application 111. Distributed processing where some activity described is performed by 111 and other activity described is performed by wildfire forecast tool 130 is implied as within the scope of what is described even where processing is only described with respect to one of the two entities herein. Further details about the functionality of wildfire forecast tool 130 are described below with respect to FIG. 2.

Weather models 140 may be any numerical weather models or information available for public use for forming weather forecasts (e.g., wildfire forecasts or other forecasts). These models and databases may form a robust data set based on various sensor measurements and simulated weather on various weather variables throughout a region where a utility is present.

Figure 2:
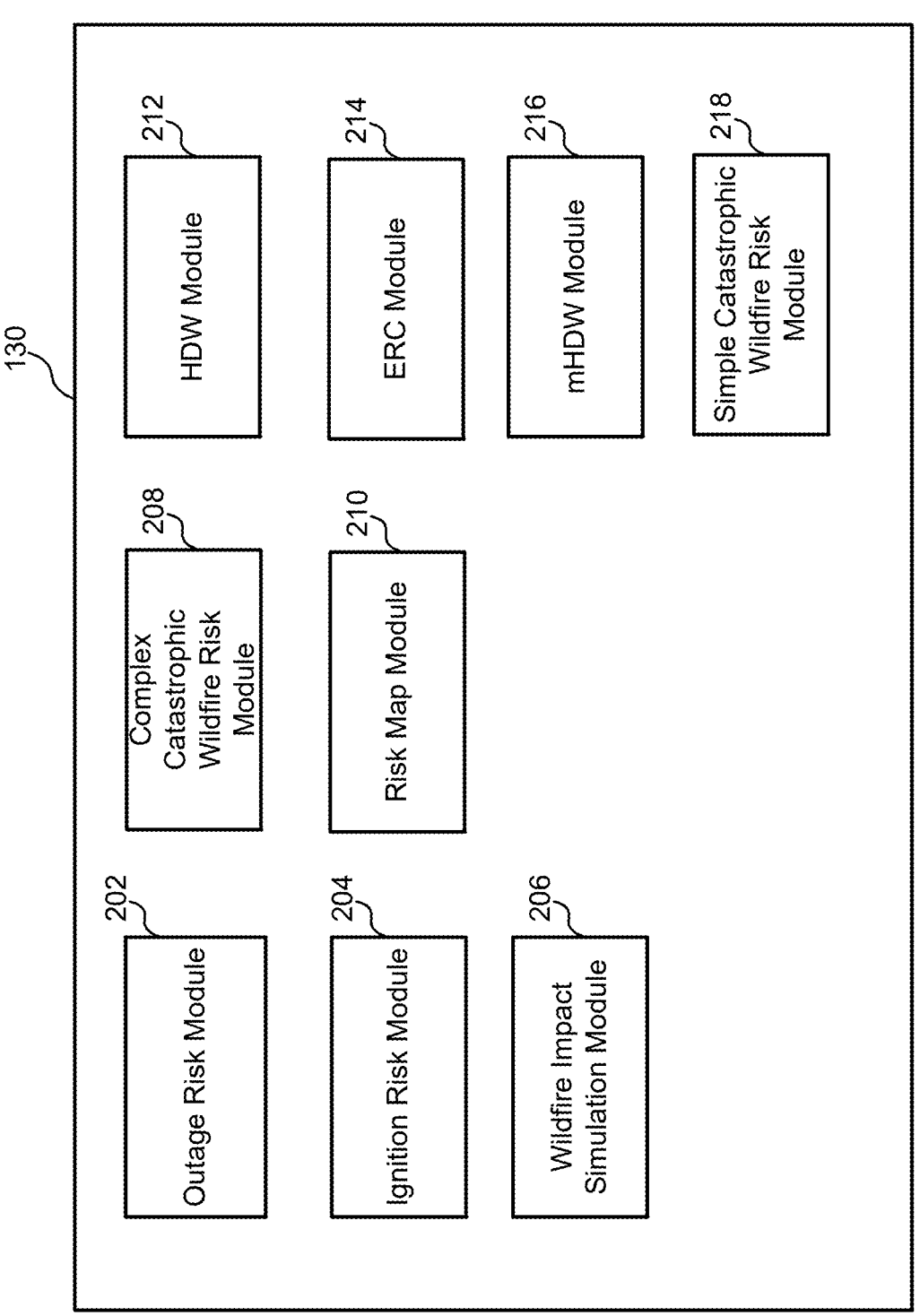
FIG. 2 illustrates one embodiment of modules used by the wildfire forecast tool.

FIG. 2 illustrates one embodiment of modules used by the wildfire forecast tool. As depicted in FIG. 2, wildfire forecast tool 130 includes outage risk module 202, ignition risk module 204, wildfire impact simulation module 206, complex catastrophic wildfire risk module 208, risk map module 210, HDW (Hot-Dry-Windy) module 212, ERC module 214, mHDW (modified HDW) module 216, and simple catastrophic wildfire risk module 218. The modules shown with respect to FIG. 2 are merely exemplary, and fewer or more modules may be used to achieve the functionality disclosed herein. Wildfire forecast tool 130 is able to provide "complex" or "simple" catastrophic wildfire risk assessments. The "complex" catastrophic wildfire risk assessment is more precise than the "simple" catastrophic wildfire risk assessment, but the simple catastrophic wildfire risk assessment requires less computational expense and sensor input in order to output a reasonably accurate catastrophic wildfire risk.

Outage risk module 202 determines, for any given utility component, a probability that an outage will occur. The term outage, as used herein, may refer to an event where a utility component generates a potential to ignite a wildfire (e.g., trips a fuse, emits a spark, explodes, etc.). The term utility component, as used herein, may refer to any tangible object provided by a utility that is subject to ignition through servicing the utility (e.g., a power line, a transformer, a battery, and so on). The utility may be used to provide electricity or any other form of utility for consumption by end users (e.g., buildings). Outage risk module 202 determines the probability of an outage using a machine learning model, sometimes referred to as an outage model. The outage model may be any classifier model, such as a convolutional neural network (CNN), deep learning network, random forest model, regression model, or any other model. The outage model may include a Bayesian framework that predicts probability distributions of utility component outages.

The outage model may be trained using training examples from historical fires, the training examples indicating at least a representation of wind speed and attributes of a given utility component as paired with a label indicating whether or not an outage was experienced. Wind is particularly important, as wind has a strong correlation to outages. The representation of wind speed may include any or all of actual wind speed, percentile of wind speed (relative to historical recorded wind speeds), or any other representation corresponding to strength of wind. For example, the percentile may be relative to a sliding window of recorded wind data (e.g., a window of the most recent 30 years), where the percentile is relative to that recorded data. The representation of wind speed may be a classification based on an actual or percentile measurement (e.g., elevated outages occur at the $90^{th}$, $98^{th}$, and $99^{th}$ percentiles, and so classifications of "high," "very high," and "extremely high" may be applied respectively). The attributes of the given utility component may include any features that describe the utility component, such as age, conductor type(s), materials, characteristics of land surrounding the utility component (e.g., vegetation, fuel type, dryness, slope, etc.), and so on.

Outage risk module 202 determines outage risk by inputting wind data and utility data corresponding to a utility component into the trained outage model. The wind data may include forecasted wind strength, and may be divided for different chunks of time. For example, the wind data may be an hour-by-hour forecasted wind speed. Wind data may be forecasted on a per-pixel basis, where pixels represent regions on the earth of any given resolution (e.g., 2 KM, 5 KM, etc.) where the wind data predicted is generally representative of the region. Wind data may be obtained from a database, such as a Global Ensemble Filter Service (GEFS) that predicts weather across the globe on a recurring basis. The region may in some embodiments be, for a pixel, a hexagonal shape. The utility data includes the attributes of the given utility component, optionally including attributes of its surroundings. Outage risk module 202 may retrieve the attributes of the given utility component from one or more databases (e.g., provided by the utility and/or compiled by wildfire forecast tool 130). For example, the utility may provide information about the component such as age, materials, and technical specifications, and wildfire forecast tool 130 may determine information about the vicinity of the utility (e.g., using computer vision from satellite imagery to determine fuel characteristics). Outage risk module 202 receives, as output from the outage model, an outage risk prediction representing a probability that the utility component will have an outage. The outage risk prediction may be for chunks of time, or may be aggregated for a given collection of chunks of time (e.g., day-by-day).

Ignition risk module 204 determines a probability of ignition at a vicinity of the utility component. That is, assuming that there is an outage at a given utility component, ignition risk module 204 determines a probability that material in the vicinity of the given utility component will ignite as a consequence of the outage. Ignition risk module 204 may determine the probability of ignition by using a function that factors in fuel (e.g., vegetation), fuel dryness, and wind speed. That is, ignition risk module 204 may determine the probability of ignition at the vicinity of the utility component by inputting fuel type, fuel dryness, and wind speed at the vicinity of the utility component into a model, and receiving as output from the model the probability of ignition at the vicinity of the utility component. The ignition model may be a probabilistic model and/or may be a machine learning model. Where the ignition model is a machine learning model, it may be any supervised learning model (e.g., CNN, deep learning, etc.). The ignition model may be trained using training data having fuel type, fuel dryness, and windspeed from historical fires and from times where fires did not erupt as labeled with whether or not the fire occurred. Additionally or alternatively, the National Fire Danger Rating System's (NFDRS) Ignition Component model may be used to determine ignition risk. Ignition risk, like outage risk, may be determined for different chunks of time.

Wildfire impact simulation module 206 determines a set of wildfire impacts by simulating a wildfire in the vicinity of the utility component. Wildfire impact simulation module 206 may perform the simulation by running a simulation for a range of time assuming ignition at the utility component and based on the wind data and environmental data in the vicinity of the utility component. The simulation may take inputs of any number of variables, such as where a fire originates, weather conditions (e.g., wind direction and force, heat, etc.), fuel conditions (e.g., type of material that a fire may burn through to reach the given building), landscape conditions (e.g., slope and other topography factors), obstacles (e.g., nearby buildings), likelihood of intervention (e.g., based on distance to a nearest fire department), and so on. The variables are input into a function that outputs a dynamic fire spread simulation across the topography (e.g., used to determine whether the fire would reach the given building). The function may include stochastic and/or machine learning models that are initialized and/or trained using historical data showing how fire spread and the impact it caused based on a historical ignition. The function integrates both traditional and advanced modeling approaches, including stochastic, machine learning, and established fire spread models like Rothermel. These models are initialized and/or trained using historical datasets that detail the patterns and impacts of fire spread resulting from past ignition events. The range of time may be default, or may be prescribed by an administrator (e.g., a simulation for a time range of 8 hours). Simulations may be run assuming the ignition occurs at any given chunk of time, and simulations may be run for each chunk of time.

Wildfire impact simulation module 206 extracts the set of wildfire impact measure from an end of the range of time, each wildfire impact measurement of the set indicative of one or more measures of destruction caused by the simulated wildfire. Impact may be measured in any number of ways, such as any combination of one or more of buildings lost, buildings damaged, acres burned, whether a fire was contained within a certain amount of time, whether a fire was contained within a certain amount of acres, and so on. In some embodiments, the impact measurements may be raw data. In other embodiments, the raw data may be converted into percentiles (e.g., how the raw data compares against historical raw data, such as this is in the top 1% of fires in terms of acres burned in this month of the year).

In some embodiments, the set of wildfire impact measures may include an initial attack assessment projecting a likelihood of success of containment by firefighting within a threshold amount of time or within some other metric. That is, for example, assuming a normal firefighting response, wildfire impact simulation module 206 determines whether the firefighting will be successful within a certain amount of minutes or hours, and/or whether the fire will be contained within a certain number of acres, and/or whether the fire will be contained before a building is lost, etc. In some embodiments, the initial attack assessment is determined by inputting fire behavior metrics and environmental metrics into a machine learning model, and receiving, as output from the machine learning model, an indication of whether an initial attack would be likely to succeed based on whatever metric is being used. The machine learning model may be trained using training examples from historical fires (e.g., as a non-limiting example, caused by utility component outages that indicate attributes of the utility component (e.g., terrain attributes)) and/or environmental attributes (e.g., weather, wind, etc.) as labeled with whether an initial attack was successful based on the metric (e.g., was the historical fire stopped within a certain number of acres, a certain amount of time, etc.).

Complex catastrophic wildfire risk module 208 determines a "complex" catastrophic wildfire risk by inputting the outage risk prediction, the probability of ignition, and the set of wildfire impact measurements into a machine learning model. Complex catastrophic wildfire risk module 208 receives, as output from the machine learning model, a catastrophic wildfire risk score corresponding to the utility component. The machine learning model may be trained using training examples that are constructed by retroactively determining outage risk prediction and probability of ignition for historical wildfires, and populating the data with wildfire impacts from each respective historical wildfire. The training data may be labeled with whether the fire is consequential. Consequential may be defined by an administrator to mean any number of things, from a certain of number of acres have burned, a certain number of buildings are damaged or lost, and so on. The machine learning model may be trained to predict whether a given fire is consequential using the training examples. Complex catastrophic wildfire risk may be determined for each given chunk of time, where the data for each of those chunks of time is used as collective input to the model.

Risk map module 210 outputs a graphical representation on a dashboard representing the catastrophic wildfire risk score (whether complex or simple, where simple wildfire risk score is detailed further below). The graphical representation may be any visualization showing relative risk for different utility components. For example, risk map module 210 may output a map having color coding for different utility components, each color corresponding to a prescribed level of risk. As another example, risk map module 210 may output a dashboard showing risk levels for different utility components. FIG. 3 illustrates an exemplary user interface showing outage consequence risk as determined by the wildfire forecast tool, in accordance with an embodiment. As shown in FIG. 3, dashboard 300 shows risk over a four day time horizon for different utility components. Each utility component has a cell for each day of the forecast, each cell shaded or otherwise color coded based on risk.

The cells in FIG. 3 are merely exemplary; risk map module 210 may show risk scores in any number of ways (e.g., numerical risk scores). Risk may be shown on more or less granular timelines (e.g., risk by the hour, by the minute, by the week, etc.), rather than day-by-day as shown in FIG. 3. In some embodiments, risk map module 210 may indicate confidence in risk determinations in addition to risk determinations themselves (e.g., by using lighter shades where it is less confident as the forecast goes out further in time, as shown in FIG. 3).

Figure 4:
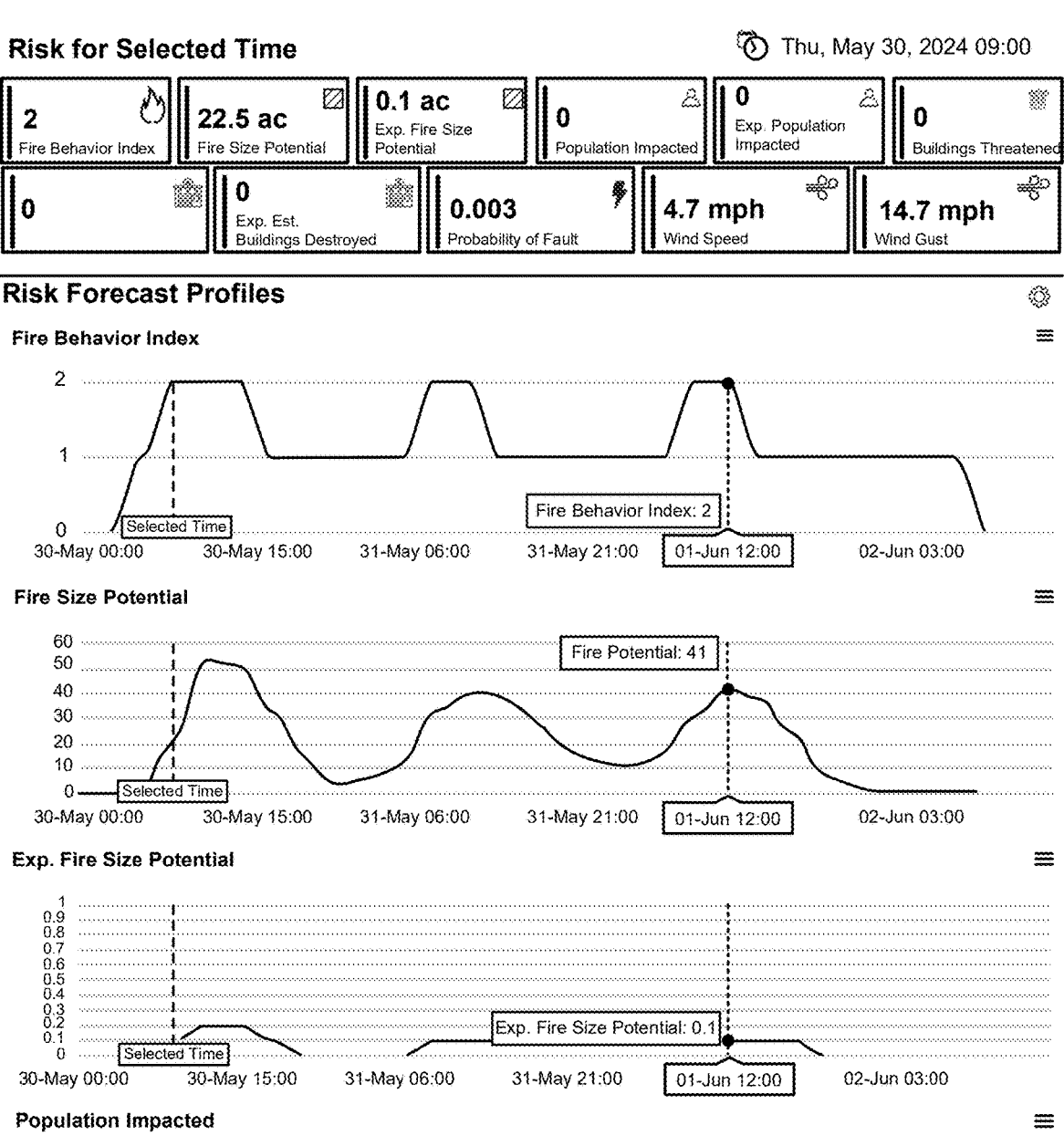
FIG. 4 illustrates an exemplary user interface showing risk forecast profiles as determined by the wildfire forecast tool, in accordance with an embodiment.

In some embodiments, more granular data may be shown by risk map module 210 regarding risk for utility components. FIG. 4 illustrates an exemplary user interface showing risk forecast profiles as determined by the wildfire forecast tool, in accordance with an embodiment. User interface 400 may be shown, for example, responsive to selection of a utility component (e.g., selection of a component from user interface 300). As shown in user interface 300, a time may be selected, and parameters corresponding to that time may be shown (e.g., predicted wind speed, predicted wind gust, fire size potential, and so on).

FIG. 5 illustrates an exemplary flowchart illustrating a process for determining a catastrophic wildfire index relating to outage risk, in accordance with an embodiment. Process 500 may be executed by one or more processors of wildfire forecast tool 130 causing the modules of wildfire forecast tool 130 to perform various operations. Process 500 may begin with wildfire forecast tool 130 inputting 510 wind data and utility data corresponding to a utility component into a first machine learning model (e.g., using outage risk module 202). Wildfire forecast tool 130 may receive 520, as output from the first machine learning model, an outage risk prediction representing a probability that the utility component will have an outage (e.g., using outage risk module 202).

Wildfire forecast tool 130 may determine 530 a probability of ignition at a vicinity of the utility component (e.g., using ignition risk module 204) and may determine 540 a set of wildfire impact measurements by simulating a wildfire in the vicinity of the utility component (e.g., using wildfire impact simulation module 206). Wildfire forecast tool 130 may input 550 the outage risk prediction, the probability of ignition, and the set of wildfire impact measurements into a second machine learning model, and may receive 560, as output from the second machine learning model, a catastrophic wildfire risk score corresponding to the utility component (e.g., using complex catastrophic wildfire risk module 208). Wildfire forecast tool 130 may output 570 a graphical representation on a dashboard representing the catastrophic wildfire risk score.

Returning to FIG. 2, this disclosure will now turn to determining a simple catastrophic wildfire score. The term simple refers to usage of fewer machine learning models and fewer data points to come up with a catastrophic wildfire score for a utility component. The simple metric leverages a Hot Dry Windy (HDW) score to generate a modified HDW (mHDW), which is then used to determine risk. Because heat, dryness, and windiness are significant components in determining fire risk, this metric is highly probative of whether a fire will become consequential.

HDW module 212 determines a HDW index value for a vicinity around a utility component. In order to determine these values, HDW module 212 inputs atmospheric conditions (e.g., temperature and moisture content, weather conditions) in the vicinity into a HDW model, and receives the HDW index value as output from the HDW model. Weather conditions includes wind conditions within a region (e.g., pixel) containing the utility component (e.g., forecasted weather conditions for a certain time range). The HDW model multiplies maximum wind speed from the weather conditions by a maximum vapor pressure deficit (e.g., within a threshold amount of millibars in the atmosphere, such as within the lowest 50 millibars within the atmosphere). The vapor pressure deficit may be determined by combining moisture and temperature (e.g., forecasted moisture and temperature parameters) into a single variable.

Energy Release Component (ERC) module 214 determines an ERC percentile by inputting fuel loading and combustibility characteristics into an ERC model, and receiving, as output from the ERC model, the ERC percentile. The ERC module 214 performs the ERC percentile calculation for each region (e.g., pixel) for which a catastrophic wildfire score is being determined. ERC may be calculated using a well known formula from the National Fire Danger Rating System (NFDRS) of the United States of America. The ERC is related to available energy per unit area (e.g., square foot) within the flaming front at the head of a fire. The ERC is considered a composite fuel moisture index as it reflects the contribution of all live and dead fuels to potential fire intensity. As live fuels cure and dead fuels dry, the ERC will increase and can be described as a build-up index. The ERC is a cumulative index incorporating memory from the last seven days. ERC module 214 accesses fuel loading information (e.g., the vegetation at the front of a fire or a predicted fire) and combustibility characteristics (e.g., dryness, moisture, etc.) from a database and/or real-time sensors. The ERC percentile reflects the relative ERC value in relation to prior historical ERC values.

mHDW module 216 aggregates the HDW index and the ERC percentile into a modified HDW (mHDW) metric. In some embodiments, mHDW module 216 performs this aggregation by multiplying the HDW index and the ERC percentile together. In an embodiment, mHDW module 216 multiplies the HDW*ERC Percentile to get a raw mHDW value. mHDW module 216 then takes the percentile of the mHDW raw values to determine the final mHDW value.

In an embodiment, mHDW module 216 inputs the HDW index and the ERC percentile into a machine learning model trained to output the mHDW metric. The model may trained on past fire events. For example, training examples may include, for a prior fire, an HDW index for that fire and the ERC percentile for that fire. Each example may be labeled by either a raw mHDW value or a percentile of the mHDW (or both), where the final mHDW value may be either the raw value or the percentile value.

Simple catastrophic wildfire risk module 218 determines a catastrophic wildfire risk score by inputting forecasted fire characteristics for the vicinity of the utility component and the mHDW metric for that utility metric into a machine learning model. The forecasted fire characteristics may be or include a measure of ignition risk as determined by ignition risk module 204. Simple catastrophic wildfire risk module 218 receives, as output from the machine learning model, a likelihood of a fire being of consequence (e.g., growing to a threshold size, or any other consequence measure as discussed above). Risk map module 210 may then display risk based on the simple catastrophic wildfire risk score in the same manner discussed above with respect to the complex catastrophic wildfire risk score.

The machine learning model used to determine the simple catastrophic wildfire risk score may trained by simple catastrophic wildfire risk module 218 accessing training examples. The training examples may each include a given historical mHDW value and corresponding fire characteristics for a given historical fire as labeled with whether the given historical was determined to meet the metric defining whether or not it was of consequence. Simple catastrophic wildfire risk module 218 may train the machine learning model using the training examples. As new fires occur and data about those new fires becomes accessible, simple catastrophic wildfire risk module 218 may re-train the machine learning model. Simple catastrophic wildfire risk module 218 may construct the training examples by determining given HDW index and ERC values for the given historical fire based on recorded parameters from the historical fire, and then determining the given historical mHDW value based on the given HDW index and ERC values for the given historical fire.

In some embodiments, simple catastrophic wildfire risk module 218 may have a plurality of levels of consequence. For example, a fire may be "of consequence," or may be "catastrophic," where "of consequence" defines a lower threshold of damage for any given resource (e.g., acres burned, buildings damaged or destroyed, etc.) than "catastrophic." In some embodiments, a second machine learning model may be trained to determine whether a fire will be catastrophic, where the training data is labeled instead with whether the historical fire was catastrophic. In other embodiments, the training data may have two labels, one indicating whether the historical fire was catastrophic and the other whether the historical fire was of consequence. Where a second machine learning model is used, a wind gust percentile for the vicinity of the utility component and a percentile of the mHDW may be input into the second machine learning model, and simple catastrophic wildfire risk module 218 may receive, as output from the second machine learning model, a probability that the utility component will cause a catastrophic wildfire.

FIG. 6 illustrates an exemplary flowchart illustrating a process for determining a risk index based on a modified hot dry windy analysis, in accordance with an embodiment. Process 600 may be executed by one or more processors of wildfire forecast tool 130 causing the modules of wildfire forecast tool 130 to perform various operations. Process 600 may begin with wildfire forecast tool 130 determining 610 a HDW index for a vicinity around a utility component. To determine the HDW index, HDW module 212 inputs atmospheric conditions and weather conditions in the vicinity into a HDW model, and receives receiving the HDW index as output from the HDW model.

Wildfire forecast tool 130 then determines 620 an Energy Release Component (ERC) percentile. To determine the ERC percentile, ERC module 214 inputs fuel loading and combustibility characteristics into an ERC model, and receives, as output from the ERC model, the ERC percentile;

Wildfire forecast tool 130 then aggregates 630 the HDW index and the ERC percentile into a modified HDW (mHDW) metric (e.g., using mHDW module 216). Wildfire forecast tool 130 inputs 640 forecasted fire characteristics for the vicinity and the mHDW metric into a machine learning model and receives 650, as output from the machine learning model, a likelihood of a fire growing to a threshold size (e.g., using simple catastrophic wildfire risk module 218). Wildfire forecast tool 130 generates 660 for display a fire risk metric for the vicinity based on the likelihood of the fire growing to the threshold size (e.g., using risk map module 210).

An additional metric, Fire Potential Index (FPI), may be used to quantify fire activity potential over a territory, aiming to assist operational decision-making to reduce fire threats and risks. FPI allows agencies to easily analyze the short-term fire danger that could exist across the service territory and better communicate the wildfire potential on any given day and time, promoting safe and reliable operations. Hexel-based (h3) FPI can be used to forecast periodically (e.g., daily), calculated on a cadence (e.g., every 3 hours) at different h3 resolutions from level 4 to 8 (182 ac and 1 km resolution approximately). One of the main advantages of FPI is that it was calibrated with real fires using historical fire data from 2012 to 2022, using VIIRS hotspots as a proxy of fire activity. In an embodiment, FPI estimates the expected daily number of VIIRS hotspots in a h3-hexel level 6.

FPI may be calculated using a machine learning model. The inputs to the model may include fuel measurements (e.g., complexity, availability), terrain, and weather. Determining fuel inputs, terrain inputs, and weather inputs (e.g., wind gust, wind speed, snow mask effect) is disclosed in the foregoing. These inputs together may be input into a machine learning model to predict the FPI for a given location. The machine learning model may be trained using ground truth data from historical fires indicating fuel, terrain, and weather information for those fires as labeled by the fact that a fire occurred, along with information for where fires did not occur as labeled with the fact that a fire did not occur.

ADDITIONAL CONFIGURATION CONSIDERATIONS

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion.

For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for sampling to form an ensemble filter through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method comprising:
inputting wind data and utility data corresponding to a utility component into a first machine learning model, wherein the first machine learning model is trained using training examples indicating at least a representation of wind speed and attributes of a given utility component as paired with a label indicating whether or not an outage was experienced, and wherein as new outages are experienced, the first machine learning model is re-trained using new training examples indicating, for the new outages, at least a representation of new wind speed and new attributes of a utility component that experienced a new outage;
receiving, as output from the first machine learning model, an outage risk prediction representing a probability that the utility component will have an outage;
determining a probability of ignition at a vicinity of the utility component;
determining a set of wildfire impact measurements by simulating a wildfire in the vicinity of the utility component;
inputting the outage risk prediction, the probability of ignition, and the set of wildfire impact measurements into a second machine learning model;
receiving, as output from the second machine learning model, a catastrophic wildfire risk score corresponding to the utility component; and
outputting a graphical representation on a dashboard representing the catastrophic wildfire risk score.

2. The method of claim 1, wherein the first machine learning model comprises a Bayesian framework that predicts probability distributions of utility component outages.

3. The method of claim 1, wherein determining the probability of ignition at the vicinity of the utility component comprises:

inputting fuel type, fuel dryness, and wind speed at the vicinity of the utility component into a model; and
receiving as output from the model the probability of ignition at the vicinity of the utility component.

4. The method of claim 1, wherein simulating the wildfire in the vicinity of the utility component comprises:
running a simulation for a range of time assuming ignition at the utility component and based on the wind data and environmental data in the vicinity of the utility component; and
extracting the set of wildfire impact measurements from an end of the range of time, each wildfire impact measurement of the set indicative of one or more measures of destruction caused by the simulated wildfire.

5. The method of claim 1, wherein the set of wildfire impact measurements comprises an initial attack assessment projecting a likelihood of success of containment by firefighting within a threshold amount of time.

6. The method of claim 5, wherein the initial attack assessment is determined by:
inputting fire behavior metrics and environmental metrics into a third machine learning model; and
receiving, as output from the third machine learning model, an indication of whether an initial attack would be likely to succeed.

7. The method of claim 1, wherein the second machine learning model is trained by:
constructing training examples by:
for each historical instance of a fire caused by a utility outage:
generating training data by determining historical outage risk prediction and historical probability, and adding a historical set of wildfire impacts; and
generate a training example by collating the training data with a label indicating whether the fire is consequential; and
training the second machine learning model to predict whether a given fire is consequential using the training examples.

8. A non-transitory computer-readable medium comprising memory with instructions encoded thereon that, when executed, cause one or more processors to perform operations, the instructions comprising instructions to:
input wind data and utility data corresponding to a utility component into a first machine learning model, wherein the first machine learning model is trained using training examples indicating at least a representation of wind speed and attributes of a given utility component as paired with a label indicating whether or not an outage was experienced, and wherein as new outages are experienced, the first machine learning model is re-trained using new training examples indicating, for the new outages, at least a representation of new wind speed and new attributes of a utility component that experienced a new outage;
receive, as output from the first machine learning model, an outage risk prediction representing a probability that the utility component will have an outage;
determine a probability of ignition at a vicinity of the utility component;
determine a set of wildfire impact measurements by simulating a wildfire in the vicinity of the utility component;
input the outage risk prediction, the probability of ignition, and the set of wildfire impact measurements into a second machine learning model;

receive, as output from the second machine learning model, a catastrophic wildfire risk score corresponding to the utility component; and output a graphical representation on a dashboard representing the catastrophic wildfire risk score.

9. The non-transitory computer-readable medium of claim 8, wherein the first machine learning model comprises a Bayesian framework that predicts probability distributions of utility component outages.

10. The non-transitory computer-readable medium of claim 8, wherein the instructions to determine the probability of ignition at the vicinity of the utility component comprise instructions to:

input fuel type, fuel dryness, and wind speed at the vicinity of the utility component into a model; and receive as output from the model the probability of ignition at the vicinity of the utility component.

11. The non-transitory computer-readable medium of claim 8, wherein the instructions to simulate the wildfire in the vicinity of the utility component comprise instructions to:

run a simulation for a range of time assuming ignition at the utility component and based on the wind data and environmental data in the vicinity of the utility component; and extract the set of wildfire impact measurements from an end of the range of time, each wildfire impact measurement of the set indicative of one or more measures of destruction caused by the simulated wildfire.

12. The non-transitory computer-readable medium of claim 8, wherein the set of wildfire impact measurements comprises an initial attack assessment projecting a likelihood of success of containment by firefighting within a threshold amount of time.

13. The non-transitory computer-readable medium of claim 12, wherein the initial attack assessment is determined by:

inputting fire behavior metrics and environmental metrics into a third machine learning model; and receiving, as output from the third machine learning model, an indication of whether an initial attack would be likely to succeed.

14. The non-transitory computer-readable medium of claim 8, wherein the second machine learning model is trained by:

constructing training examples by:

for each historical instance of a fire caused by a utility outage:

generating training data by determining historical outage risk prediction and historical probability, and adding a historical set of wildfire impacts; and generate a training example by collating the training data with a label indicating whether the fire is consequential; and training the second machine learning model to predict whether a given fire is consequential using the training examples.

15. A system comprising:

memory with instructions encoded thereon; and one or more processors that, when executing the instructions, are caused to perform operations comprising:

inputting wind data and utility data corresponding to a utility component into a first machine learning model, wherein the first machine learning model is trained using training examples indicating at least a representation of wind speed and attributes of a given utility component as paired with a label indicating whether or not an outage was experienced, and wherein as new outages are experienced, the first machine learning model is re-trained using new training examples indicating, for the new outages, at least a representation of new wind speed and new attributes of a utility component that experienced a new outage;

receiving, as output from the first machine learning model, an outage risk prediction representing a probability that the utility component will have an outage;

determining a probability of ignition at a vicinity of the utility component;

determining a set of wildfire impact measurements by simulating a wildfire in the vicinity of the utility component;

inputting the outage risk prediction, the probability of ignition, and the set of wildfire impact measurements into a second machine learning model;

receiving, as output from the second machine learning model, a catastrophic wildfire risk score corresponding to the utility component; and outputting a graphical representation on a dashboard representing the catastrophic wildfire risk score.

16. The system of claim 15, wherein the first machine learning model comprises a Bayesian framework that predicts probability distributions of utility component outages.

17. The system of claim 15, wherein determining the probability of ignition at the vicinity of the utility component comprises:

inputting fuel type, fuel dryness, and wind speed at the vicinity of the utility component into a model; and receiving as output from the model the probability of ignition at the vicinity of the utility component.

\* \* \* \* \*